US012795725B2

(12) United States Patent
Chu et al.

(10) Patent No.: US 12,795,725 B2
(45) Date of Patent: Nov. 10, 2026

(54) LOW LATENCY SUPPORT IN mmWave LINK

(71) Applicant: NXP USA, Inc., Austin, TX (US)

(72) Inventors: Liwen Chu, San Ramon, CA (US); Kiseon Ryu, San Diego, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 435 days.

(21) Appl. No.: 18/383,002

(22) Filed: Oct. 23, 2023

(65) Prior Publication Data

US 2024/0137982 A1 Apr. 25, 2024
US 2024/0237066 A9 Jul. 11, 2024

Related U.S. Application Data

(60) Provisional application No. 63/380,430, filed on Oct. 21, 2022.

(51) Int. Cl.

| | |
|---|---|
| ***H04W 74/0816*** | (2024.01) |
| ***H04W 52/02*** | (2009.01) |
| ***H04W 74/08*** | (2024.01) |
| ***H04W 84/12*** | (2009.01) |

(52) U.S. Cl.
CPC ... *H04W 74/0816* (2013.01); *H04W 74/0866* (2013.01)

(58) Field of Classification Search
CPC ......... H04W 74/0816; H04W 74/0866; H04W 52/0216; H04W 84/12
See application file for complete search history.

(56) References Cited

U.S. PATENT DOCUMENTS

| | | | | |
|---|---|---|---|---|
| 2018/0249496 A1* | 8/2018 | Radulescu | H04B 7/06952 | |
| 2021/0329500 A1* | 10/2021 | Cariou | H04W 28/24 | |
| 2021/0360646 A1* | 11/2021 | Chu | H04W 52/0229 | |
| 2022/0070772 A1* | 3/2022 | Ho | H04W 52/0216 | |
| 2023/0087887 A1* | 3/2023 | Ajami | H04W 74/0808 | 370/329 |
| 2023/0139168 A1* | 5/2023 | Xin | H04W 52/0216 | 370/311 |
| 2023/0140312 A1* | 5/2023 | Ajami | H04W 52/0229 | 370/329 |
| 2023/0199842 A1* | 6/2023 | Lopez | H04L 27/0006 | 370/329 |
| 2023/0269788 A1* | 8/2023 | Xia | H04L 47/2416 | 370/329 |
| 2024/0027572 A1* | 1/2024 | Sehgal | G01S 13/10 | |
| 2024/0179744 A1* | 5/2024 | Baek | H04W 74/0808 | |
| 2024/0324014 A1* | 9/2024 | Baek | H04W 28/02 | |
| 2024/0381265 A1* | 11/2024 | Shafin | H04W 52/0258 | |
| 2025/0031198 A1* | 1/2025 | Xia | H04L 1/00 | |
| 2025/0056614 A1* | 2/2025 | Quan | H04W 8/22 | |
| 2025/0192837 A1* | 6/2025 | Ciochina-Kar | H04B 7/0617 | |

* cited by examiner

*Primary Examiner* — Harry H Kim

(57) ABSTRACT

A method and apparatus for wireless communications are disclosed which includes announcing R-TWT support from a first wireless station to a second wireless station in a broadcast PPDU, negotiating R-TWT schedule membership with the second wireless station, the negotiating comprising sending a low latency indication and identifying low latency TIDs of a R-TWT schedule, and sending frames in accordance with the R-TWT schedule in the identified low latency TIDs.

17 Claims, 7 Drawing Sheets

LOW LATENCY SUPPORT IN mmWave LINK

CROSS-REFERENCE TO RELATED APPLICATIONS

This application is entitled to the benefit of U.S. Provisional Patent Application Ser. No. 63/380,430 filed on Oct. 21, 2022, which is incorporated by reference herein.

BACKGROUND

In multi-link communications, an access point (AP) multi-link device (MLD) transmits various types of information using different transmission techniques to a non-AP MLD. For example, a wireless AP MLD wirelessly transmits data to one or more wireless stations in a non-AP MLD through one or more wireless communications links, such as a millimeter wave (mmWave) link. To facilitate the proper data transmission within a multi-link communications system having a mmWave link, a multi-link communications technology is used to efficiently convey communications signaling information, for example, information related to data, communications links, and/or multi-link devices (e.g., operation and/or capability parameters of multi-link devices) within the multi-link communications system.

In the use of bandwidth-limited data networks, some systems allow different types of traffic to be given different priorities. The latency of voice traffic must be kept low in order for a conversation to feel natural. The latency of video traffic must be kept low in order to avoid stuttering or buffering. For other traffic, such as data file transfers, data backups, rendering web pages, etc., some latency may be tolerated with no significant impact on the user experience.

EDCA (Enhanced Distributed Channel Access) is used in WiFi networks, as defined in IEEE 802.11a, and later, to provide eight user priorities and four access categories. The access categories are defined as AC_VO for voice traffic, AC_VI for video traffic, AC_BE for traffic that requests a best effort, and AC_BK for background traffic. EDCA allows latency to be reduced for some traffic at the expense of increasing the latency of other traffic and at the expense of adding computational and signaling overhead.

SUMMARY

Embodiments of a method and apparatus for wireless communications are disclosed. In an embodiment, a method includes announcing R-TWT support from a first wireless station to a second wireless station in a broadcast PPDU, negotiating R-TWT schedule membership with the second wireless station, the negotiating comprising sending a low latency indication and identifying low latency TIDs of a R-TWT schedule, and sending frames in accordance with the R-TWT schedule in the identified low latency TIDs.

In an embodiment negotiating further comprises adding an indication that the negotiated R-TWT schedule membership applies to a negotiated individual R-TWT.

In an embodiment the adding the indication comprises adding the indication to a TWT element of a frame.

In an embodiment the TWT element further carries identifiers of the low latency TIDs being serviced in the sending the frames.

An embodiment includes announcing that a backoff and retry request to send is disabled for the second wireless station.

An embodiment includes announcing that the first wireless station will be in a low power mode outside of the R-TWT schedule.

An embodiment includes the first wireless station disables receiving requests using an EDCA parameter set from a second wireless station outside of the R-TWT schedule.

An embodiment includes receiving a request to send from a second wireless station, wherein the request to send includes a request to initiate a transmit opportunity, and sending a clear to send to the second wireless station, wherein the clear to send indicates a duration of the transmit opportunity An embodiment includes announcing an EDCA parameter set for R-TWT members that is different from an EDCA parameter set for other wireless stations.

An embodiment includes announcing a R-TWT schedule including a Target Wake Time, wherein the Target Wake Time is expressed in an element that includes a broadcast TWT ID.

In an embodiment negotiating R-TWT schedule membership is performed without the use of a trigger-based TB PPDU and wherein sending frames is performed without a TB PPDU.

An embodiment includes announcing from the first wireless station that a mmWave transmit opportunity begins with a request to send, receiving a request to send from the second wireless station, wherein the request to send includes a request to initiate a transmit opportunity, and sending a clear to send to the second wireless station, wherein the clear to send indicates a duration of the transmit opportunity.

In an embodiment, a method includes announcing TWT support from a first wireless station to a second wireless station in an individual PPDU, negotiating TWT schedule membership with the second wireless station, the negotiating comprising sending a low latency indication and identifying low latency TIDs of the TWT schedule, and sending frames in accordance with the TWT schedule in the identified low latency TIDs.

In an embodiment negotiating further comprises adding an indication that the negotiated TWT schedule membership applies to a negotiated individual TWT.

In an embodiment the adding the indication comprises adding the indication to a TWT element of a frame.

In an embodiment the TWT element further carries identifiers of the low latency TIDs being serviced in the sending the frames.

In an embodiment, the method includes announcing from a first wireless station that a mmWave transmit opportunity begins with a request to send; receiving a request to send from a second wireless station, wherein the request to send includes a request to initiate a transmit opportunity, and sending a clear to send to the second wireless station, wherein the clear to send indicates a duration of the transmit opportunity.

An embodiment includes sending a contention free-end to the second wireless station to end the transmit opportunity.

An embodiment includes including a duration element in the RTS to define a duration of the transmit opportunity.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
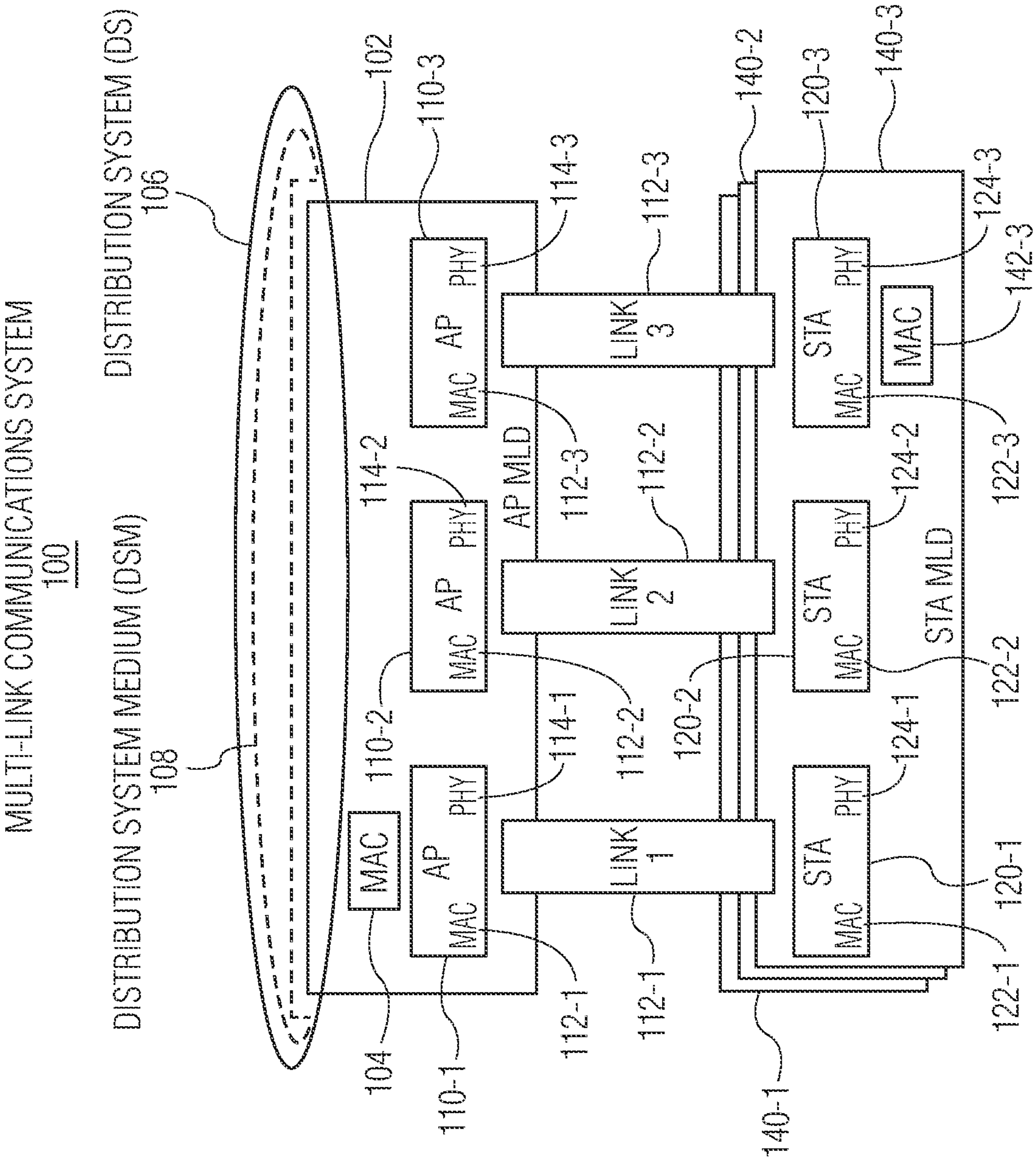
FIG. 1 depicts a multi-link communications system in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

In embodiments of a wireless communications system, a wireless device, e.g., an access point (AP) multi-link device (MLD) of a wireless local area network (WLAN) may transmit data to at least one associated wireless station (STA) MLD. The AP MLD may be configured to operate with associated STA MLDs according to a communication protocol. For example, the communication protocol may be an Institute of Electrical and Electronics Engineer (IEEE) 802.11 communication protocol.

FIG. 1 depicts a multi-link (ML) communications system 100 in accordance with an embodiment of the invention. In the embodiment depicted in FIG. 1, the multi-link communications system includes at least one AP multi-link device (MLD) 102, and one or more non-AP multi-link devices, which are, for example, implemented as wireless station (STA) MLDs 140-1, 140-2, 140-3. The multi-link communications system can be used in various applications, such as industrial applications, medical applications, computer applications, and/or consumer or appliance applications. In some embodiments, the multi-link communications system is a wireless communications system, such as a wireless communications system compatible with an Institute of Electrical and Electronics Engineers (IEEE) 802.11 protocol.

Although the depicted multi-link communications system 100 is shown in FIG. 1 with certain components and described with certain functionality herein, other embodiments of the multi-link communications system 100 may include fewer or more components to implement the same, less, or more functionality. For example, although the multi-link communications system 100 is shown in FIG. 1 includes the AP MLD 102 and the STA MLDs 140-1, 140-2, 140-3, in other embodiments, the multi-link communications system includes other multi-link devices, such as, multiple AP MLDs and multiple STA MLDs, multiple AP MLDs and a single STA MLD, a single AP MLD and a single STA MLD. In another example, in some embodiments, the multi-link communications system includes more than three STA MLDs and/or less than three STA MLDs. In yet another example, although the multi-link communications system 100 is shown in FIG. 1 as being connected in a certain topology, the network topology of the multi-link communications system 100 is not limited to the topology shown in FIG. 1.

In the embodiment depicted in FIG. 1, the AP MLD 102 includes multiple radios, implemented as APs 110-1, 110-2, 110-3. In some embodiments, the AP MLD 102 is an AP multi-link logical device or an AP multi-link logical entity (MLLE). In some embodiments, a common part of the AP MLD 102 implements upper layer Media Access Control (MAC) functionalities (e.g., beaconing, association establishment, reordering of frames, etc.) in an upper layer MAC device 104 and a link specific part of the AP MLD 102, i.e., the APs 110-1, 110-2, 110-3, implement lower layer MAC functionalities (e.g., backoff, frame transmission, frame reception, etc.) in lower layer MAC devices 122-1, 122-2, 122-3. The APs 110-1, 110-2, 110-3 may be implemented in hardware (e.g., circuits), software, firmware, or a combination thereof. At least one of the APs 110-1, 110-2, 110-3 may be fully or partially implemented as an integrated circuit (IC) device. In some embodiments, the AP MLD and its affiliated APs 110-1, 110-2, 110-3 are compatible with at least one wireless local area network (WLAN) communications protocol (e.g., at least one IEEE 802.11 protocol). For example, the APs 110-1, 110-2, 110-3 may be wireless APs compatible with at least one WLAN communications protocol (e.g., at least one IEEE 802.11 protocol).

In some embodiments, an AP MLD (e.g., the AP MLD 102) is connected to a local network (e.g., a local area network (LAN)) and/or to a backbone network (e.g., the Internet) through a wired connection and wirelessly connects to wireless STAs, for example, through one or more WLAN communications protocols, such as an IEEE 802.11 protocol. In some embodiments, an AP, e.g., the AP 110-1, the AP 110-2, and/or the AP 110-3, includes at least one antenna, at least one transceiver operably connected to the at least one antenna, and at least one controller operably connected to the corresponding transceiver. In some embodiments, at least one transceiver includes a physical layer (PHY) device 114-1, 114-2, 114-3 for each AP. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver.

In some embodiments, each of the APs 110-1, 110-2, 110-3 of the AP MLD 102 operates in different frequency bands. For example, at least one of the APs 110-1, 110-2, 110-3 of the AP MLD 102 operates in an Extremely High Frequency (EHF) band or the "millimeter wave (mmWave)" frequency band. In some embodiments, the mmWave frequency band is a frequency band between 20 Gigahertz (GHz) and 300 GHz. For example, the mmWave frequency band is a frequency band above 45 GHz, e.g., a 60 GHz frequency band. For example, the AP 110-1 may operate at 6 Gigahertz (GHz) band (e.g., in a 320 MHz (one million hertz) Basic Service Set (BSS) operating channel or other suitable BSS operating channel), the AP 110-2 may operate at 5 GHz band, e.g., a 160 MHz BSS operating channel or other suitable BSS operating channel, and the AP 110-3 may operate at 60 GHz band, e.g., a 160 MHz BSS operating channel or other suitable BSS operating channel.

In the embodiment depicted in FIG. 1, the AP MLD is connected to a distribution system (DS) 106 through a distribution system medium (DSM) 108. The distribution system (DS) 106 may be a wired network or a wireless network that is connected to a backbone network such as the Internet. The DSM 108 may be a wired medium, e.g., Ethernet cables, telephone network cables, or fiber optic cables, or a wireless medium, e.g., infrared, broadcast radio, cellular radio, or microwaves. Although the AP MLD 102 is shown in FIG. 1 as including three APs, other embodiments of the AP MLD 102 may include fewer than three APs or more than three APs. In addition, although some examples of the DSM 108 are described, the DSM 108 is not limited to the examples described herein.

In the embodiment depicted in FIG. 1, the STA MLD 140-3 includes radios, which are implemented as multiple non-AP stations (STAs) 120-1, 120-2, 120-3. The STAs 120-1, 120-2, 120-3 may be implemented in hardware (e.g., circuits), software, firmware, or a combination thereof. At least one of the STAs 120-1, 120-2, 120-3 may be fully or partially implemented as an IC device. In some embodiments, the non-AP STAs 120-1, 120-2, 120-3 are part of the STA MLD 140-3, such that the STA MLD may be a communications device that wirelessly connects to a wireless AP MLD, such as, the AP MLD 102. For example, the STA MLD 140-3 (e.g., at least one of the non-AP STAs 120-1, 120-2, 120-3) may be implemented in a laptop, a desktop personal computer (PC), a mobile phone, or other communications device that supports at least one WLAN communications protocol. In some embodiments, the STA MLD 140-3 and its affiliated STAs 120-1, 120-2, 120-3 are compatible with at least one IEEE 802.11 protocol.

In some embodiments, each of the non-AP STAs 120-1, 120-2, 120-3 includes at least one antenna, at least one transceiver operably connected to the at least one antenna, and at least one controller connected to the corresponding transceiver. In some embodiments, the at least one transceiver includes a PHY device 124-1, 124-2, 124-3. The at least one controller operably may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver. In some embodiments, the STA MLD 140-3 has one MAC data service interface 142-3. In an embodiment, a single address is associated with the MAC data service interface 142-3 and is used to communicate on the DSM 108. In some embodiments, the STA MLD 140-3 implements a common MAC data service interface 142-3 and the non-AP STAs 120-1, 120-2, 120-3 implement a lower layer MAC data service interface 122-1, 122-2, 122-3.

In some embodiments, the AP MLD 102 and/or the STA MLDs 140-1, 140-2, 140-3 identify which communications links support the multi-link operation during a multi-link operation setup phase and/or exchanges information regarding multi-link capabilities during the multi-link operation setup phase. Each of the STAs 120-1, 120-2, 120-3 of the STA MLD may operate in a different frequency band. For example, at least one of the STAs 120-1, 120-2, 120-3 of the STA MLD 140-3 operates in the mmWave frequency band. In some embodiments, the mmWave frequency band is a frequency band between 20 GHz and 300 GHz. For example, the mmWave frequency band is a frequency band above 45 GHz, e.g., a 60 GHz frequency band. For example, the STA 120-1 may operate at 6 GHz band (e.g., in a 320 MHz BSS operating channel or other suitable BSS operating channel), the STA 120-2 may operate at 5 GHz band (e.g., a 160 MHz BSS operating channel or other suitable BSS operating channel), and the STA 120-3 may operate at 60 GHz band (e.g., a 160 MHz BSS operating channel or other suitable BSS operating channel). Although the STA MLD 140-3 is shown in FIG. 1 as including three non-AP STAs, other embodiments of the STA MLD 140-3 may include fewer than three non-AP STAs or more than three non-AP STAs.

Each of the STA MLDs 140-1, 140-2 may be the same as or similar to the STA MLD 140-3. For example, the STA MLD 140-1 or 140-2 includes multiple non-AP STAs. In some embodiments, each of the non-AP STAs includes at least one antenna, at least one transceiver operably connected to the at least one antenna, and at least one controller connected to the corresponding transceiver. In some embodiments, the at least one transceiver includes a PHY device. The at least one controller operably may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 140-3 communicates with the AP MLD 102 through multiple communications links 112-1, 112-2, 112-3. For example, each of the STAs 120-1, 120-2, 120-3 communicates with an AP 110-1, 110-2, or 110-3 through a corresponding communications link 112-1, 112-2, or 112-3. Although the AP MLD 102 communicates (e.g., wirelessly communicates) with the STA MLD 140-3 through multiple links 112-1, 112-2, 112-3, in other embodiments, the AP MLD 102 may communicate (e.g., wirelessly communicate) with the STA MLD through more than three communications links or less three than communications links. In the embodiment depicted in FIG. 1, the communications links 112-1, 112-2, 112-3 between the AP MLD and the STA MLD 140-3 involve at least one mmWave link. For example, the communications links 112-1, 112-2, 112-3 between the AP MLD 102 and the STA MLD 140-3 include a mmWave link (e.g., a 45/60 GHz link) between an AP of the AP MLD 102 and a STA of the STA MLD 140-3 operating in a mmWave frequency band (e.g., a 45/60 GHz frequency band) and two non-mmWave links (e.g., 2.4 GHz, 5 GHz, or 6 GHz links) and two mmWave links (e.g., a 45 GHz link and a 60 GHz link) between APs of the AP MLD 102 and STAs of the STA MLD 140-3 operating in non-mmWave frequency bands (e.g., 2.4 GHz, 5 GHz, or 6 GHz frequency bands).

In another example, the communications links 112-1, 112-2, 112-3 between the AP MLD 102 and the STA MLD 140-3 include two mmWave links (e.g., 45/60 GHz links) between APs of the AP MLD 102 and STAs of the STA MLD 140-3 operating in mmWave frequency bands (e.g., 45/60 GHz frequency bands) and one non-mmWave link (e.g., a 2.4 GHz, 5 GHz, or 6 GHz link) between an AP of the AP MLD 102 and an STA of the STA MLD 140-3 operating in a non-mmWave frequency bands (e.g., a 2.4 GHz, 5 GHz, or 6 GHz frequency band). The control and management of a mmWave link, for example, a 45 GHz/60 GHz link may be performed in a non-mmWave link, for example, a 2.4 GHz, 5 GHz, or 6 GHz link. For example, the association of a non-AP MLD with a mmWave link can be done through a non-mmWave MHz link. However, beaconing and channel switch can be challenging for a MLD system with one or more mmWave links.

Figure 2:
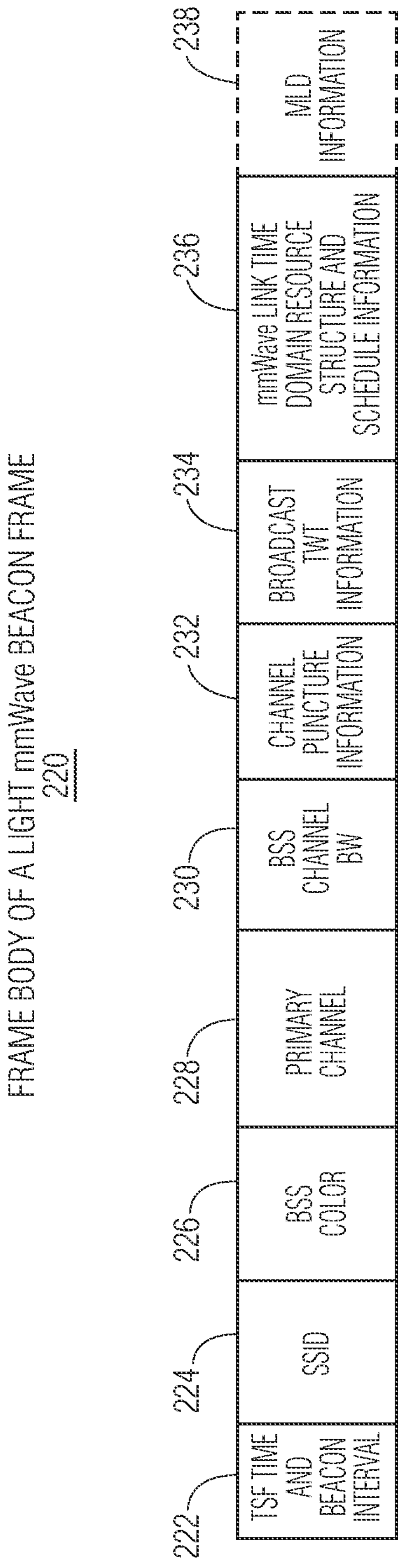
FIG. 2 depicts an example format of a frame body of a light mmWave Beacon Frame in accordance with an embodiment of the invention.

FIG. 2 depicts an example format of the frame body in a light mmWave Beacon Frame 220 (the MAC header, Frame Check Sequence (FCS) of the light Beacon Frame are not shown) in accordance with an embodiment of the invention. In some embodiments, a light mmWave Beacon Frame 220 is used. The full information of a mmWave link can be announced in a non-mmWave link, for example a 2.4/5/6 GHz link. In some embodiments, if the minimal channel in a mmWave link is 160 MHz, the primary channel information 228 is updated accordingly.

In the embodiment depicted in FIG. 2, the frame body of the light mmWave Beacon Frame 220 includes a field containing TSF time and beacon interval 222, an element containing SSID 224 or short SSID, a field containing the BSS color 226 of a corresponding BSS (e.g., a BSS with which a mmWave AP is affiliated), a field containing the primary channel information 228, a field containing the bandwidth (BW) of the BSS operating channel 230, an optional field containing the channel puncture information 232, an optional field containing broadcast TWT information 234, a field containing mmWave link time domain resource structure and schedule information 236, and an optional field 238 containing the AP MLD information with which a mmWave AP is affiliated.

Although the fields of the light mmWave Beacon Frame 220 are shown in FIG. 2 in a certain order, other embodiments of the light mmWave Beacon Frame may include the same, fewer, or more fields in a different order. In one embodiment, a Control field may be required to carry the information about whether each optional field is carried or not. In addition, although the frame body of the light mmWave Beacon Frame 220 is shown in FIG. 2 with certain fields, other embodiments of the light mmWave Beacon Frame may include fewer or more fields to carry the same, less, or more information. A mmWave link 112-1, (e.g., a 45 GHz link or a 60 GHz link) between an AP MLD 102 and a non-AP STA MLD 140-3 can be used to transmit a light mmWave Beacon Frame 220. In one embodiment, a full mmWave Beacon Frame is not defined. In another embodiment, a full mmWave Beacon Frame may also be defined and used to suit particular circumstances. The full mmWave Beacon Frame contains more fields including RNR (Reduced Neighbor Report) information and a Basic Multi-Link element.

For 2.4 GHz, 5 GHz, and 6 GHz bands, WiFi 6/WiFi 6E and later support low latency traffic using individual TWT (Target Wake Time) transmissions and/or broadcast TWT transmissions. TWT increases sleep time and improves battery life. It allows wireless devices to negotiate specific times to wake and exchange frames. During other times, the wireless devices may sleep or exchange frames with other devices.

Three types of TWT have been defined:

Individual TWT: The client (STA) chooses when to wake up and when to sleep. The client negotiates an agreement with the AP (Access Point). Other clients listen to know when other clients will wake up and send data to avoid collisions;

Broadcast TWT: The AP provides the schedule to any clients that are operating using broadcast TWT; and Opportunistic power savings TWT: This mode allows a peer-to-peer (P2P) Group Owner to opportunistically save power when all its associated clients are sleeping.

R-TWT (Restricted Target Wake Time) reserves the medium for the low latency traffic streams of the wireless devices that are a part of the R-TWT schedule membership. Other STAs end any ongoing communication before the start of an advertised R-TWT SP (Service Period). With R-TWT, an AP sets a quiet interval of 1024 μs with the same start time as the protected R-TWT SP. Any STAs that are not members of the schedule are quiet within the 1024 μs. After that, each STA that is not the R-TWT SP member can contend the medium access through the backoff procedure for the frames other than R-TWT TIDs.

R-TWT is used in part to provide guaranteed service. The typical frame transmission in a R-TWT SP is done through a triggered TB (Trigger-Based) PPDU. Within each R-TWT SP, the frames of R-TWT TIDs (Traffic Identifiers) are transmitted before transmitting the frames of any other TIDs. Each R-TWT STA ensures that its TXOP ends at the beginning of a R-TWT SP (Service Period) announced by the associated AP.

In non-mmWave link, the EDCA parameters specific for low latency traffic streams are not defined, the medium access through EDCA cannot guarantee the priority transmission of the frames of the R-TWT TIDs before the other frames. If the same thing happens in mmWave link, in mmWave bands, EDCA parameters are not suitable for supporting the frame exchanges of low latency traffic. In another observation, the TB PPDU may not be supported in mmWave band to simplify the implementation.

In some examples, individual R-TWT, broadcast R-TWT, and EDCA (Enhanced Distributed Channel Access) is added to mmWave transmission but EDCA is restricted to use within a negotiated TWT (Target Wake Time) SP (Service Period). A STA that is not the member of a TWT SP cannot use the EDCA in the TWT SP.

In other examples, a STA that is not the member of a TWT SP can use the EDCA to contend the medium outside the TWT SPs that the STA is the member. At the beginning of a TXOP with its associated AP as the TXOP responder, a STA as the TXOP holder transmits a RTS with the Duration to indicate the end time of the TXOP. If its associated AP finds that the TXOP will interfere its high priority activity, i.e., the TXOP ends after the start of an individual TWT SP where the STA is not the member, the associated AP can decrease the remaining TXOP time through the Duration field of its responding CTS (Clear to Send) so that the remaining time of the TXOP will be decided by the responding CTS frame. The STA makes sure that its frame exchanges with the AP in the TXOP will end as indicated by The Duration field in the responding CTS. If its associated AP finds that the responding of the CTS will interfere its high priority activity, i.e. the responding CTS ends after the start of an individual TWT SP where the STA is not the member, the AP as the TXOP responder will not respond with transmitting the CTS. If its associated AP finds that the frame exchange following the responding CTS will interfere its high priority activity, i.e. the responding CTS ends after the start of an individual TWT SP where the STA is not the member, the AP as the TXOP responder will not respond with transmitting the CTS.

In other examples, high priority EDCA parameters are used to accomplish low latency for traffic frame transmission. A mmWave AP announces the low latency EDCA parameters that are different from the parameters in EDCA Parameter Set element for mmWave STA's medium access contention for low latency traffic frames.

Individual R-TWT and Broadcast R-TWT in mmWave Link

A mmWave AP can announce whether it supports individual R-TWT and/or broadcast R-TWT. The nature of the broadcast R-TWT may be similar to that of the R-TWT in 802.11be. The negotiation of broadcast R-TWT schedule membership in a mmWave link may be performed in a manner similar to the negotiation of R-TWT schedule membership in a non-mmWave link, e.g., a 2.4 GHz, 5 GHz, or 6 GHz band.

To support low latency for high priority traffic, in particular, the negotiation of the individual R-TWT schedule for a mmWave link adds a low latency indication and indications of the related low latency TIDs being serviced in the individual R-TWT schedule. The low latency TIDs for TWT may be carried in TWT negotiation. In 802.11be when R-TWT is negotiated, such TIDs will be announced by the client STA.

These indications may be added whether the negotiated schedule is for an individual TWT or for an individual R-TWT. These indications may be added in the TWT element of e.g., a light mmWave Beacon Frame. The TWT element for the individual R-TWT carries the TIDs of low latency traffic being serviced in the negotiated individual TWT SPs.

Figure 3:
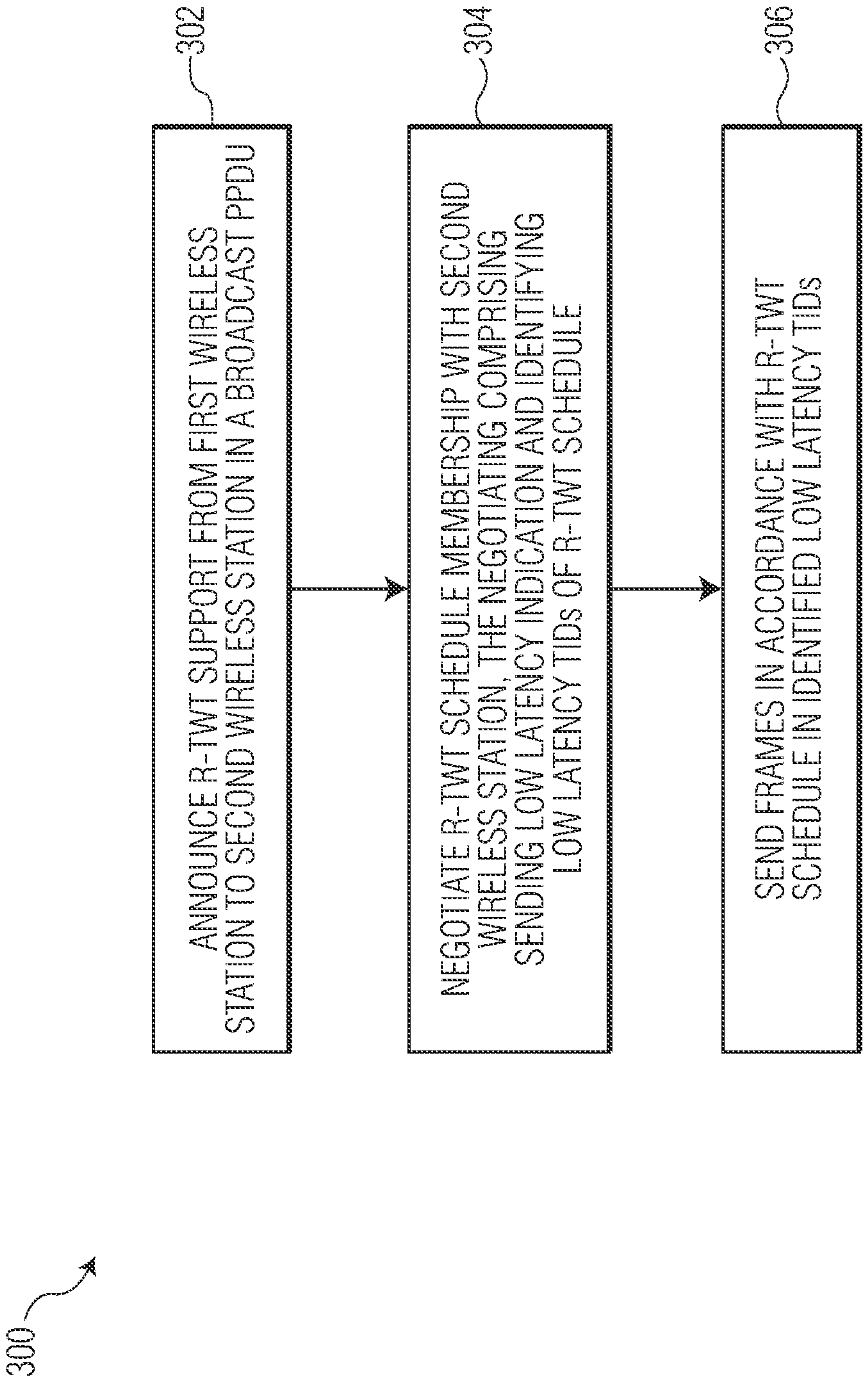
FIG. 3 depicts a process flow diagram of wireless communication to negotiate R-TWT schedule membership in accordance with an embodiment of the invention.

FIG. 3 is a process flow diagram of a method 300 for wireless communications in accordance with an embodiment of the invention. At a first wireless multi-link device (MLD), e.g., an AP, a millimeter wave (mmWave) Beacon Frame is generated, e.g., a Light Beacon Frame or another frame. At 302. R-TWT support is announced from a first wireless station to a second wireless station in a broadcast PPDU. At 304; R-TWT schedule membership is negotiated with the second wireless station, the negotiating comprising sending a low latency indication and identifying low latency TIDs of a R-TWT schedule. At 306, frames are sent in accordance with the R-TWT schedule in the identified low latency TIDs. In some examples, there is a frame exchange. The method is suitable for broadcast R-TWT.

Figure 4:
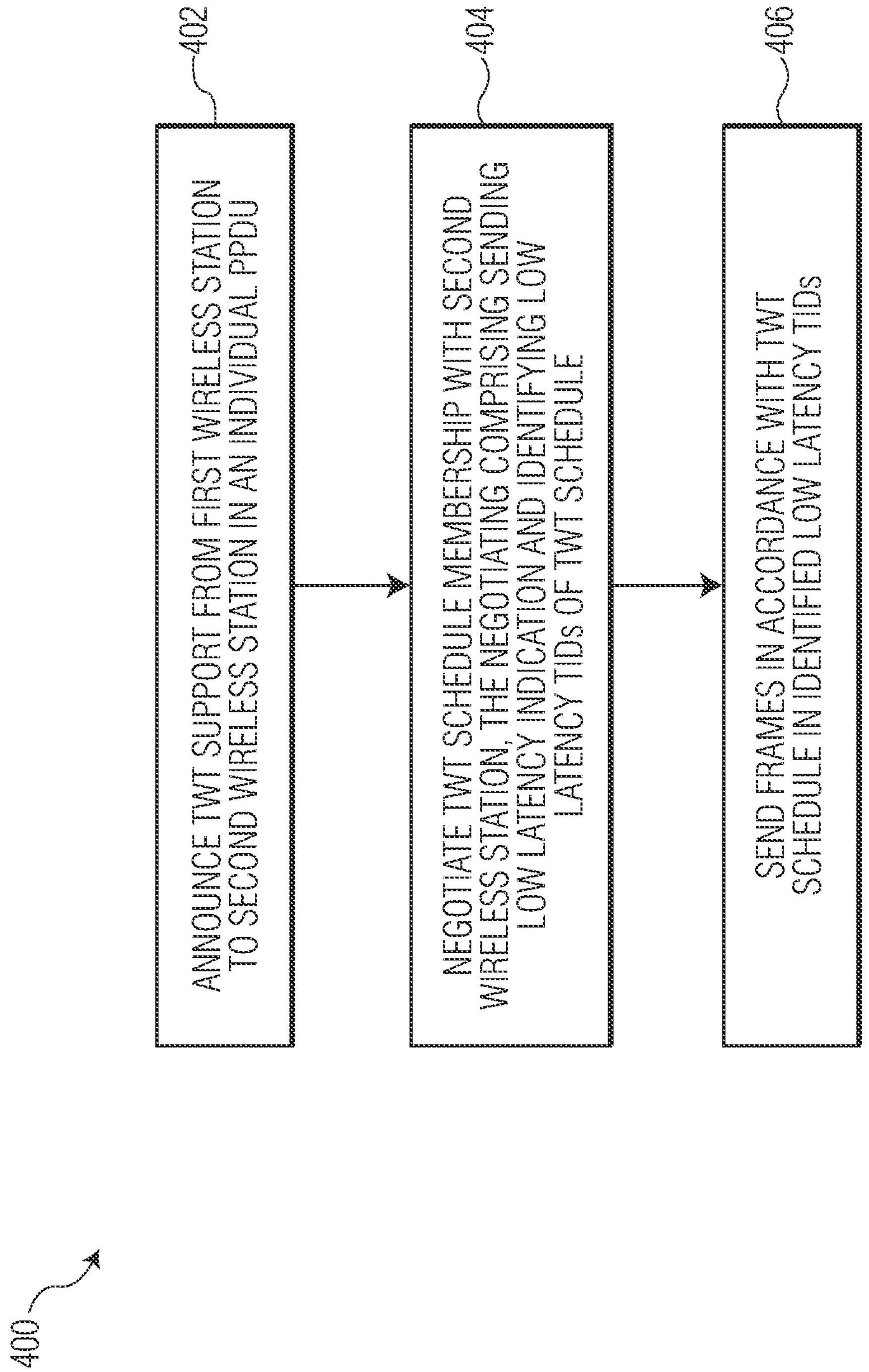
FIG. 4 depicts a process flow diagram of wireless communication to negotiate TWT schedule membership in accordance with an embodiment of the invention.

FIG. 4 is a process flow diagram of a method 400 for wireless communication in accordance with an embodiment of the invention. At a first wireless multi-link device (MLD), e.g., a STA, at 402. TWT support is announced from a first wireless station to a second wireless station in an individual PPDU. At 404; TWT schedule membership is negotiated with the second wireless station, the negotiating comprising sending a low latency indication and identifying low latency TIDs of a TWT schedule. At 406, frames are sent in accordance with the TWT schedule in the identified low latency TIDs. In some examples, there is a frame exchange. The method is suitable for individual TWT EDCA Medium Access being Disabled Similarly, a mmWave AP may announce whether EDCA medium access will be disabled outside the negotiated individual TWT SPs and broadcast TWT SPs that the STA is the member. The announcement may be in the beacon, e.g., as a BSS Operation Element of the beacon. EDCA backoff is used for contention-based frame transmission. When negotiation is used to establish R-TWT schedules and the EDCA medium access is disabled outside the negotiated TWT SP, then contention-based access from the STAs that are not the members of R-TWT SPs may be avoided. Within the TWT SP that a STA is member, the STA can use EDCA to contend the medium for the frame exchanges with the AP.

In another example, a mmWave AP can announce the Responder PM to 1. The mmWave AP will be in a power save mode and not be available outside of the negotiated individual TWT SPs and broadcast TWT SPs. By using this feature, a STA will assume that the mmWave AP is not available outside the negotiated individual TWT SPs and the broadcast TWT SPs that the STA is the member. The contention-based access from the STAs that are not the members of TWT SPs may be avoided.

In another example, a mmWave TWT SP can be specified as being allocated only for DL (downlink) transmission or only for UL (uplink) transmission. In such an example, a mmWave TWT SP can be used for a specific mmWave STA for DL/UL transmission and/or for a P2P (peer-to-peer) communication. In some examples, the transmission may be e.g., a non-contention-based frame transmission in a dedicated SP allocation to a certain mmWave STA. In this context, a DL only mmWave TWT SP can be used for transmission of DL data/management/control frames from a mmWave AP to mmWave STAs. Immediate response frames (e.g., Ack, BA, M-BA, CTS, etc.) may be sent as UL transmission by mmWave STAs. An UL only mmWave TWT SP can be used for transmission of UL data/management/control frames from mmWave STAs to a mmWave AP. Again, immediate response frames (e.g., Ack, BA, M-BA, CTS, etc.), sent as DL transmissions by a mmWave AP may be included in the UL only TWT SP.

TXOP Responder Controlled TXOP Length,

TXOP Responder not Responding

In some embodiments, the TXOP responder controls the TXOP length in order to avoid the frame exchanges initiated by the TXOP holder to interfere with its high priority activity or the high priority activity of its co-hosted other radio. In some embodiments, the EDCA medium access is allowed outside the negotiated TWT SPs. In order to avoid the TXOP that is not the member of a TWT SP does not interfere with the TWT SP, some restriction to the TXOP that is not the member of a TWT SP may be defined. In some example, a mmWave AP that enables low latency traffic in its BSS may request that any non-AP mmWave STA, as a TXOP holder, start a TXOP with an RTS. The request may be in an announcement e.g., in a Beacon Frame. A STA, as a TXOP holder, then sends an RTS as a request to initiate a TXOP. The TXOP will be initiated upon receiving a favorable CTS from the AP, as the TXOP responder. After initiating the TXOP with the RTS, the STA then waits for a CTS from the AP. The AP may use the responding CTS to control the end of the TXOP that was initiated by the RTS from the STA. The CTS may include a duration or length element to define the duration of the TXOP or when the TXOP ends. The AP may increase or decrease the duration of the TXOP based on its high priority activity (e.g. the start time of the TWT SP for low latency traffic), the high priority activity of co-located other radio of the AP, the expected number of buffered traffic frames, the amount of other traffic, the priority of the traffic, and other factors. The TXOP holder, in this case the initiating STA respects the TXOP duration provided by the AP by ending its TXOP no later than the TXOP ending time indicated by the AP.

In some examples, the TXOP is within the context of an R-TWT SP, e.g., an individual TWT for low latency traffic.

In a first circumstance, to avoid a collision with a different individual R-TWT SP, the responding CTS may indicate that the TXOP ends at or near the beginning of a different R-TWT SP.

In another circumstance, there is insufficient time available for the single frame exchange after RTS/CTS in the TXOP requested by the STA. After receiving the soliciting RTS, the AP will not transmit CTS. The AP may decide not to send the CTS after determining that a requested frame exchange following the RTS/CTS cannot be finished before the beginning of a different individual R-TWT SP.

In another circumstance, there is insufficient time available even for an RTS/CTS exchange. After receiving the soliciting RTS the AP decides that the CTS cannot be finished before the beginning of a different individual R-TWT SP. Accordingly, the AP will not transmit a responding CTS. For any current TXOP, the AP may send a contention free-end (CF-End) message to the second wireless station to end the transmit opportunity.

While the STA has requested a TXOP using an RTS. In other circumstances, the AP sends an RTS to request a TXOP. The TXOP is then in the context of requesting an R-TWT for a broadcast TWT SP. The AP already has the R-TWT SP schedule and so it will not send an RTS if it can determine that there is insufficient time for the requested TXOP or for the CTS exchange. However, if there is sufficient time, then an RTS may be sent that includes a duration or length element to define the duration of the TXOP or when the TXOP ends.

Figure 5:
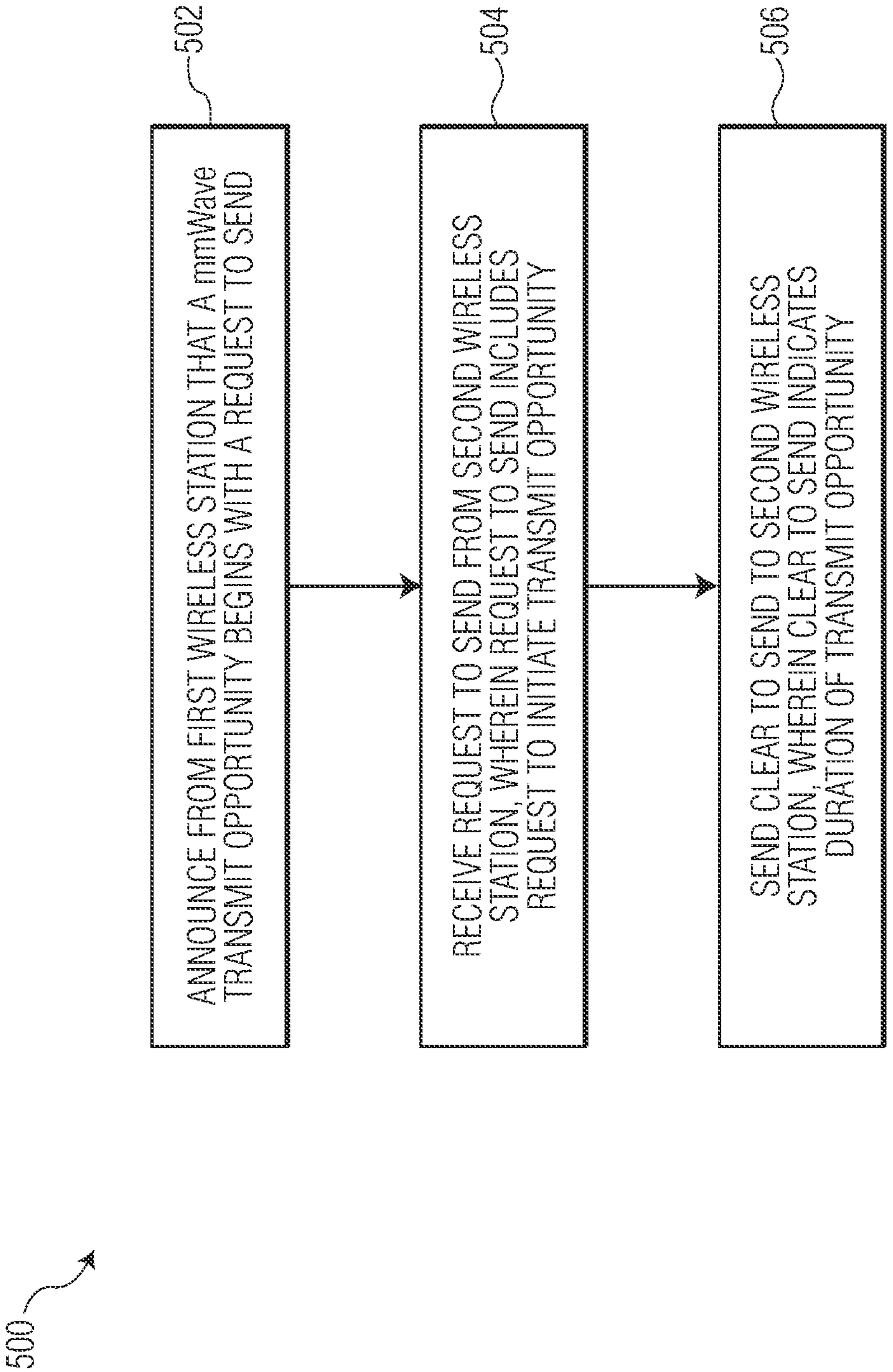
FIG. 5 depicts a process flow diagram of wireless communication to initiate a mmWave TXOP using RTS in accordance with an embodiment of the invention.

FIG. 5 is a process flow diagram of a method 500 for wireless communication in accordance with an embodiment of the invention. At a first wireless multi-link device (MLD), e.g., an AP, at 502 announces from a first wireless station that a mmWave transmit opportunity begins with a request to send. At 504, a request to send is received from a second wireless station, wherein the request to send includes a request to initiate a transmit opportunity. At 506, a clear to send is sent to the second wireless station, wherein the clear to send indicates a duration of the transmit opportunity Triggered TXOP Sharing and RD (Reverse Direction) operation The triggered TXOP sharing is used in R-TWT SP.

R-TWT in mmWave link depends on optional triggered TXOP sharing. By using triggered TXOP sharing, a mmWave AP can solicit a mmWave STA to transmit its low latency traffic frames within the allocated time by the AP without STA's medium contention through STA's backoff procedure. The AP transmits MU-RTS TXS or another Control Frame that carries the time allocated for the addressed STA to transmit its low latency traffic frames. Within the time allocated to the STA, the STA can execute one or multiple frame exchanges with the AP or another peer STA. the remaining TXOP duration and the allocated time to a STA in AP's MU-RTS TXS are in different fields. So a TXOP can be allocated to multiple STAs, e.g. within a 5 ms TXOP, the AP can allocate the nth millisecond to STAn with n equals to 1, 2, 3, 4, 5 where the Duration in nth MU-RTS TXS roughly equals to 5+1−n milliseconds.

The RD is used in R-TWT SP. By using this method, an AP uses RD method to let a STA uses the remaining time defined in the Duration field of its frame that allows the addressed STA to do one or multiple frame exchanges for the low latency traffic frames.

The method cannot support low latency P2P since the recipient of each frame transmitted by the STA in RD operation is the AP as the TXOP holder.

Differentiated EDCA Parameter Set

EDCA parameters are used in WiFi systems for determining priority and for determining backoff times. The backoff is an amount of time from one RTS that does not receive a TXOP until the next retry of an RTS. If the medium is idle for an appropriate interframe space interval after a correctly received frame and after the backoff time is expired, then the STA will transmit. To further improve network performance two different sets of EDCA parameters may be used for a TID. The first set of EDCA parameters may be announced for R-TWT non-members and a second set of EDCA parameters may be announced for R-TWT members. In a R-TWT SP, the EDCA parameters of a TID in EDCA Parameter Set element is used for non-R-TWT members to initiate the frame transmission of the TID In one example, the EDCA parameters of a TID are sent in a R-TWT SP. A new R-TWT EDCA Parameter Set element may be defined as having a smaller AIFS, Cwmin, Cwmax for low latency traffic. The new EDCA Parameter Set may be used for a R-TWT member of a R-TWT SP to initiate the frame transmission of a TID in the R-TWT SP if the R-TWT member negotiates the TID as the R-TWT TID of the R-TWT SP. If the TID is not an R-TWT TID, then the original R-TWT EDCA Parameter Set may be used for the R-TWT member to initiate a frame transmission of a TID. If a STA is not the member of a R-TWT SP, the original R-TWT EDCA Parameter Set may be used for the STA to initiate a frame transmission of a TID.

The application of the new EDCA Parameter Set may be applied to different circumstances to suit different implementations:

- In one option: The R-TWT EDCA Parameter Set element is applied to a mmWave link;
- In one option: The R-TWT EDCA Parameter Set element is applied to a link that does not support TB PPDU;
- In one option: The R-TWT EDCA Parameter Set element is applied to any link that has non-trigger enabled R-TWT; and
- In one option: the new EDCA parameters for R-TWT TID are not defined. Instead the EDCA parameters are used for the frame exchanges of R-TWT TID, and a multi-user (MU) EDCA Parameter Set may be used to initiate the frame transmission of a TID that is not a R-TWT TID. The MU EDCA Parameter Set may be used either for R-TWT members in an R-TWT SP or for non-members of a R-TWT SP.

Stated another way:

Non-R-TWT members use the MU EDCA parameters of a TID in a MU EDCA Parameter Set element to initiate the frame transmission of the TID in a R-TWT SP;

R-TWT members use the EDCA parameters of a TID in an EDCA Parameter Set element to initiate the frame transmission of the TID in a R-TWT SP if the TID is an R-TWT TID; and R-TWT members use the MU EDCA Parameter Set element of a TID to initiate the frame transmission of the TID in a R-TWT SP, if the TID is not a R-TWT TID.

The particular assignment of the different EDCA Parameter Sets may be adjusted to suit different implementations.

Guaranteed R-TWT SP

R-TWT reserves the medium for the wireless devices that are a part of the R-TWT schedule membership for the duration of the SP. This is true for the individual R-TWT SP and for the broadcast R-TWT SP. However, it may happen that STAs of a neighboring BSS may not honor the SP and perform frame exchanges with a different AP at the beginning of, or during any other part of, an R-TWT SP. With this, the AP cannot guarantee to a TWT member the negotiated medium time in the R-TWT SP. When the AP is exchanging frames as an R-TWT member, the AP may detect a narrower idle BW than was reserved in the R-TWT SP. In other words, the AP may detect traffic with a neighboring BSS during the R-TWT SP. This may occur whether the R-TWT is individual or broadcast. Due to the detected traffic, the AP ends the R-TWT SP early. As a result, there may be buffered low latency traffic frames waiting for transmission at the AP or at the STA. There may also be buffered low latency traffic frames even without traffic at a neighboring BSS.

This may be overcome when the R-TWT member remains in an awake state. At the end of an (individual or broadcast) R-TWT SP, if there are still buffered low latency traffic frames at the AP and/or an individual R-TWT member, the individual R-TWT member may remain in the awake state. The R-TWT member may resume a low power or sleep state after (a) there are buffered latency traffic frames, or (b) another (individual or broadcast) R-TWT SP starts.

Smaller Granularity of Broadcast R-TWT SP Start Time

The current broadcast TWT start time is announced through a 16-bit field with a granularity that is defined in terms of milliseconds (whose lowest bit is bit 10 of the related TSF time). The utilization of the medium may be improved for more users if the TWT start time could be announced with a smaller granularity or with smaller time intervals, e.g., a start time defined in terms of microseconds. The current information element is not able to carry a more accurate designation of the start time, e.g., more than 16 bits.

Figure 6:
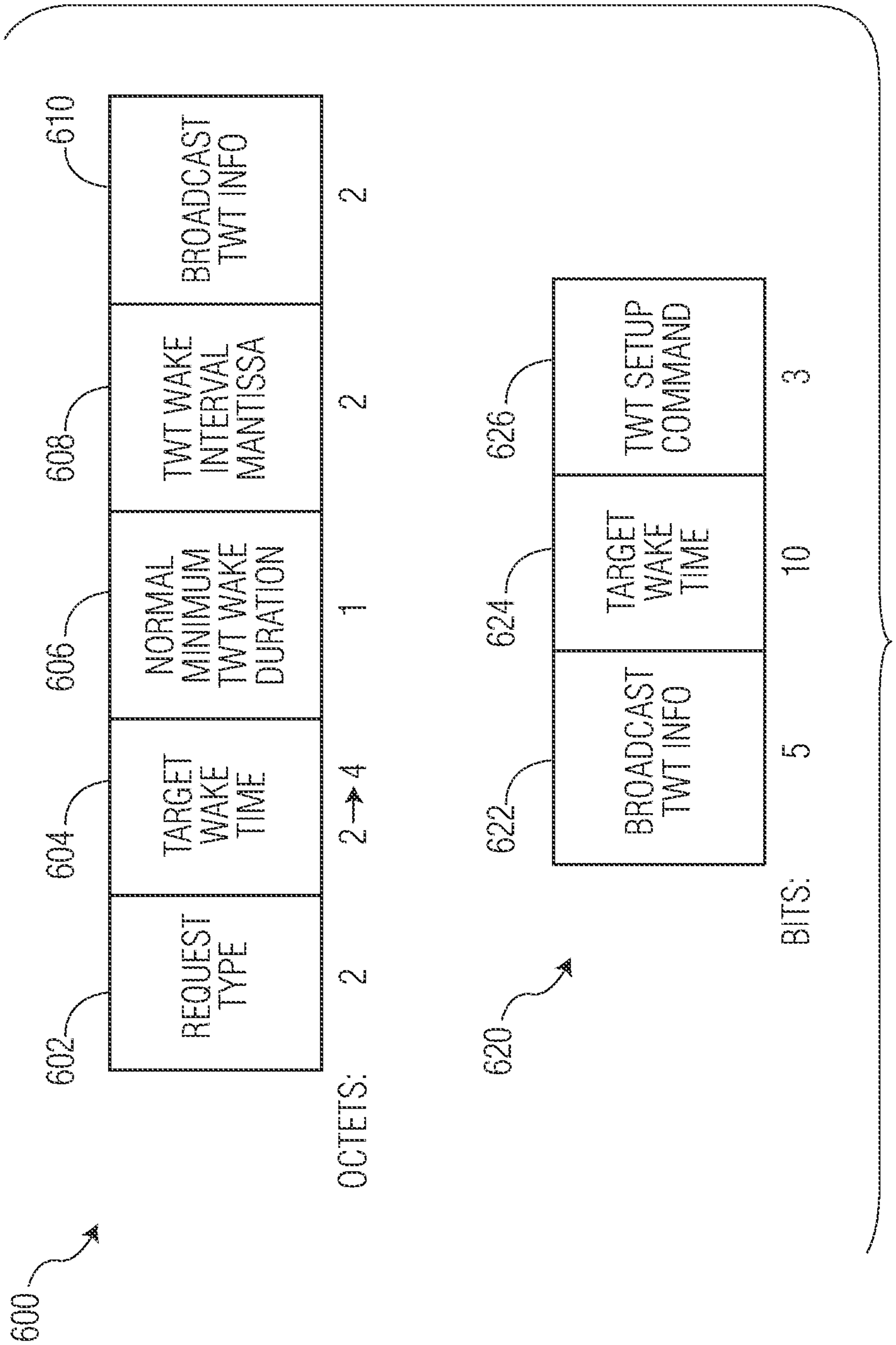
FIG. 6 depicts an example field format for a Broadcast TWT Parameter Set in accordance with an embodiment of the invention.

FIG. 6 shows the field format for a Broadcast TWT Parameter Set 600. The field format includes a Request Type 602 with 2 octets, the Target Wake Time 604 with 2 octets, the Normal Minimum TWT Wake Duration 606 with 1 octet, the TWT Wake Interval Mantissa 608 with 2 octets and the Broadcast TWT Info 610 with 2 octets. The additional data required by a smaller granularity of the Start time may be added in different ways. In one example, the TWT element for the Broadcast TWT Info 610 is redefined so that the Target Wake Time 604 is changed from a 2-octet field (e.g., 8 bits) to a 4-octet field (e.g., 16 bits) whose lowest bit is bit 0 of the related TSF time. This allows for a far more precise value to be included in the broadcast TWT Parameter Set.

In one example, the Target Wake Time 604 is unchanged but a separate element is defined. The separate element 620 has a Broadcast TWT ID 622 (5 bits), the Target Wake Time 624 bit 9 to bit 0 of the related TSF time and a TWT Setup Command 626 (3 bits). The separate element not only allows for the smaller TWT granularity but also facilitates announcing two TWT schedules with different TWT Setup Commands. An AP may announce two broadcast TWT schedules for a broadcast schedule with the same broadcast TWT ID but with different TWT Setup Commands. The TWT Setup Command becomes another identifier. In this example, there may be one broadcast TWT schedule for the current information with the broadcast schedule and another broadcast TWT schedule for the future information with the broadcast schedule.

While many features herein are described in the context of mmWave, a smaller granularity for a TWT start time may be useful for any TWT start time that uses the same or a similar broadcast frame. Accordingly, the smaller granularity may be applied to other systems and protocols that use a TWT start time, e.g., with 802.11be. In addition, many operations described as being performed by an AP may be performed by a non-AP STA and vice versa. Many operations described here as being performed by an AP MLD may be performed by a single AP with a single link and many operations described here as being performed by a STA MLD may be performed by a single STA with a single link.

Figure 7:
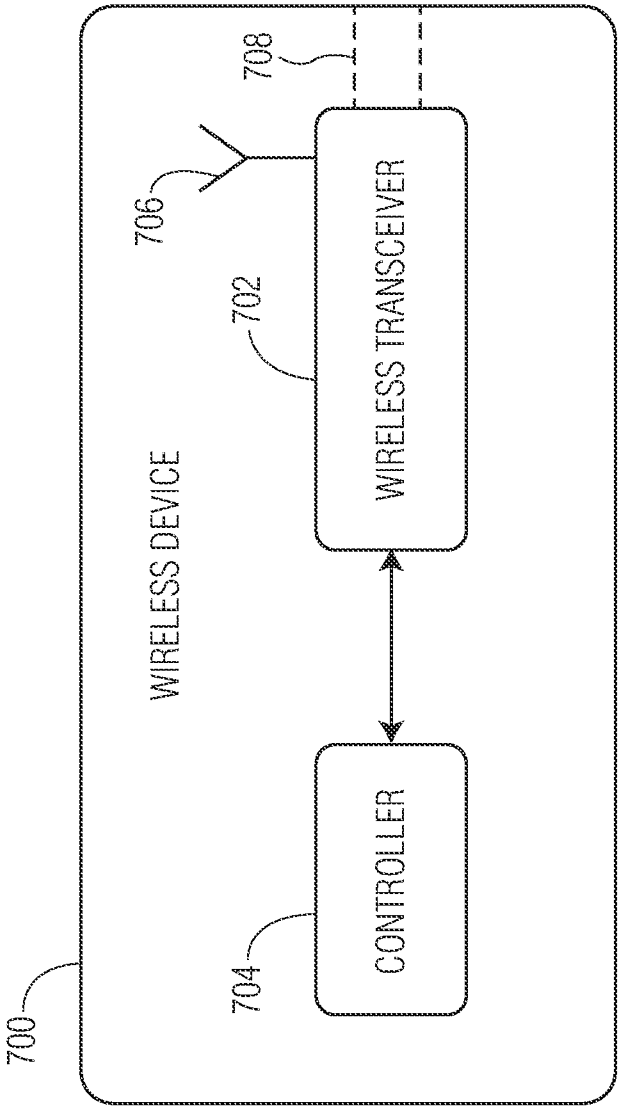
FIG. 7 depicts a wireless device in accordance with an embodiment of the invention.

FIG. 7 depicts a wireless device 700 in accordance with an embodiment of the invention. The wireless device 700 can be used in the multi-link communications system 100 depicted in FIG. 1. For example, the wireless device 700 may be an embodiment of the APs 110-1, 110-2, 110-3 and/or the STAs 120-1, 120-2, 120-3 depicted in FIG. 1. However, the APs 110-1, 110-2, 110-3 and the STAs 120-1, 120-2, 120-3 depicted in FIG. 1 are not limited to the embodiment depicted in FIG. 7. In the embodiment depicted in FIG. 7, the wireless device 700 includes a wireless transceiver 702, a controller 704 operably connected to the wireless transceiver, and at least one antenna 706 operably connected to the wireless transceiver. In some embodiments, the wireless device 700 may include at least one optional network port 708 operably connected to the wireless transceiver. In some embodiments, the wireless transceiver includes a physical layer (PHY) device. The wireless transceiver may be any suitable type of wireless transceiver. For example, the wireless transceiver may be a LAN transceiver (e.g., a transceiver compatible with an IEEE 802.11 protocol).

In some embodiments, the wireless device 700 includes multiple transceivers. The controller may be configured to control the wireless transceiver to process packets received through the antenna and/or the network port and/or to generate outgoing packets to be transmitted through the antenna and/or the network port. In some embodiments, the controller is implemented within a processor, such as a microcontroller, a host processor, a host, a DSP, or a CPU. The antenna may be any suitable type of antenna. For example, the antenna may be an induction type antenna such as a loop antenna or any other suitable type of induction type antenna. However, the antenna is not limited to an induction type antenna. The network port may be any suitable type of port. The wireless device 700 may be compatible with an IEEE 802.11 protocol.

In accordance with an embodiment of the invention, the controller 704 is configured to generate a millimeter wave (mmWave) Beacon Frame and the wireless transceiver 702 is configured to transmit the mmWave Beacon Frame to a second wireless MLD through a mmWave link between a wireless MLD to which the wireless device 700 belongs and the second wireless MLD. In some embodiments, the wireless MLD includes an access point (AP) MLD that includes a wireless AP, and the wireless AP includes the controller and the wireless transceiver. In some embodiments, the second wireless MLD includes a non-AP MLD that includes a non-AP station (STA). In some embodiments, the controller is further configured to generate full mmWave link information of the mmWave link. In some embodiments, the wireless transceiver is further configured to transmit the full mmWave link information of the mmWave link to the second wireless MLD through a non-mmWave link between the wireless MLD and the second wireless MLD. In some embodiments, the non-mmWave link includes one of a 2.4 Gigahertz (GHz) link, a 5 GHz link, or a 6 GHz link.

In some embodiments, the wireless transceiver is further configured to transmit the full mmWave link information of the mmWave link to the second wireless MLD through the mmWave link. In some embodiments, the mmWave link includes a 45 GHz link or a 60 GHz link. In some embodiments, the controller is further configured to generate a second mmWave Beacon Frame or a beacon extension that contains the full mmWave link information of the mmWave link. In some embodiments, the wireless MLD device is compatible with an Institute of Electrical and Electronics Engineers (IEEE) 802.11 protocol. In some embodiments, the controller is further configured to generate a broadcast frame that contains control or management information of the mmWave link, and wherein the wireless transceiver is further configured to transmit the broadcast frame through a non-mmWave link.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer-readable storage medium for execution by a computer. As an example, an embodiment of a computer program product includes a computer-readable storage medium to store a computer readable program.

The computer-readable or computer-useable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:

announcing restricted target wake up time (R-TWT) support from a first wireless station to a second wireless station in a broadcast physical layer protocol data unit (PPDU);

negotiating R-TWT schedule membership with the second wireless station, the negotiating comprising sending a low latency indication and identifying low latency traffic identifiers (TIDs) of a R-TWT schedule; and sending frames in accordance with the R-TWT schedule in the identified low latency TIDS; wherein negotiating R-TWT schedule membership is performed without the use of a trigger-based (TB) PPDU and wherein sending frames is performed without a TB PPDU.

2. The method of claim 1, wherein negotiating further comprises adding an indication that the negotiated R-TWT schedule membership applies to a negotiated individual R-TWT.

3. The method of claim 2, wherein the adding the indication comprises adding the indication to a target wakeup time (TWT) element of a frame.

4. The method of claim 3, wherein the TWT element further carries identifiers of the low latency traffic identifiers (TIDs) being serviced in the sending the frames.

5. The method of claim 1, further comprising announcing that a backoff and retry request to send is disabled for the second wireless station.

6. The method of claim 1, further comprising announcing that the first wireless station will be in a low power mode outside of the R-TWT schedule.

7. The method of claim 6, further comprising the first wireless station disables receiving requests using an Enhanced Distributed Channel Access (EDCA) parameter set from a second wireless station outside of the R-TWT schedule.

8. The method of claim 1, further comprising:

receiving a request to send from a second wireless station, wherein the request to send includes a request to initiate a transmit opportunity; and sending a clear to send to the second wireless station, wherein the clear to send indicates a duration of the transmit opportunity.

9. The method of claim 1, further comprising announcing an EDCA parameter set for R-TWT members that is different from an EDCA parameter set for other wireless stations.

10. The method of claim 1, further comprising announcing a R-TWT schedule including a Target Wake Time, wherein the Target Wake Time is expressed in an element that includes a broadcast TWT ID.

11. The method of claim 1, further comprising:

announcing from the first wireless station that a mmWave transmit opportunity begins with a request to send;

receiving a request to send from the second wireless station, wherein the request to send includes a request to initiate a transmit opportunity; and sending a clear to send to the second wireless station, wherein the clear to send indicates a duration of the transmit opportunity.

12. A method comprising:

announcing target wake up time (TWT) support from a first wireless station to a second wireless station in an individual physical layer protocol data unit (PPDU);

negotiating TWT schedule membership with the second wireless station, the negotiating comprising sending a low latency indication and identifying low latency traffic identifiers (TIDs) of the TWT schedule, wherein a TWT element of a light mmWave beacon frame carries identifiers of the low latency TIDs defining traffic serviced during the TWT schedule; and sending frames in accordance with the TWT schedule and the identified low latency TIDs.

13. The method of claim 12, wherein negotiating further comprises adding an indication that the negotiated TWT schedule membership applies to a negotiated individual TWT.

14. The method of claim 13, wherein the adding the indication comprises adding the indication to the TWT element of a frame.

15. A method comprising:

announcing from a first mmWave wireless station that a mmWave transmit opportunity of a restricted target wakeup time service period (R-TWT SP) begins with a request to send;

receiving a request to send from a second wireless station, wherein the request to send includes a request to initiate the transmit opportunity; and sending a clear to send to the second wireless station, wherein the clear to send indicates a duration of the transmit opportunity that is granted to the second wireless station.

16. The method of claim 15, further comprising sending a contention free-end message to the second wireless station to end the transmit opportunity.

17. The method of claim 15, further comprising including a duration element in the request to send (RTS) to define a duration of the transmit opportunity.

* * * * *